US010889207B2

(12) United States Patent
Emrich et al.

(10) Patent No.: US 10,889,207 B2
(45) Date of Patent: Jan. 12, 2021

(54) LONGITUDINAL ADJUSTER AND VEHICLE SEAT

(71) Applicant: ADIENT LUXEMBOURG HOLDING S.À R.L., Luxembourg (LU)

(72) Inventors: Holger Emrich, Erdesbach (DE); Michael Koenig, Rodenbach (DE); Martin Reischmann, Hoehfroeschen (DE); Ralf Velten, Heltersberg (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 50 days.

(21) Appl. No.: 16/317,274

(22) PCT Filed: Jul. 6, 2017

(86) PCT No.: PCT/EP2017/066922
§ 371 (c)(1),
(2) Date: Jan. 11, 2019

(87) PCT Pub. No.: WO2018/011051
PCT Pub. Date: Jan. 18, 2018

(65) Prior Publication Data
US 2019/0299816 A1 Oct. 3, 2019

(30) Foreign Application Priority Data

Jul. 14, 2016 (DE) .................. 10 2016 212 907
Sep. 19, 2016 (DE) .................. 10 2016 217 848

(51) Int. Cl.
*B60N 2/07* (2006.01)
*B60N 2/005* (2006.01)
*B60N 2/42* (2006.01)

(52) U.S. Cl.
CPC ............. *B60N 2/073* (2013.01); *B60N 2/005* (2013.01); *B60N 2/0705* (2013.01);
(Continued)

(58) Field of Classification Search
CPC .... B60N 2/073; B60N 2/0732; B60N 2/4214; B60N 2/4221; B60N 2/4228; B60N 2/005
See application file for complete search history.

(56) References Cited

U.S. PATENT DOCUMENTS 5,697,670 A * 12/1997 Husted ................. B60N 2/4221
297/216.13
5,957,535 A * 9/1999 Pasternak ............ B60N 2/0705
248/429
(Continued)

FOREIGN PATENT DOCUMENTS

DE 102006040796 A1 * 3/2007 ........... B60N 2/0705
DE 102005060480 A1 * 6/2007 ............... B60N 2/16
(Continued)

*Primary Examiner* — Eret C McNichols
(74) *Attorney, Agent, or Firm* — Marshall & Melhorn, LLC

(57) ABSTRACT

A longitudinal adjuster (10) for a vehicle seat (1) includes at least one rail pair (12) with a longitudinal direction (x) relatively sliding and engaging first seat rail (14), for connecting to a seat frame side part (6), and a second seat rail (16), for connecting to a vehicle structure. A first clamping element (20), fastened to the first seat rail and a second clamping element (22), fastened to the second seat rail are usually spaced apart from each other and engage with each other, in response to a defined application of force, for example in the event of a crash. The first clamping element has a connection section (24), which can be connected to a surface (8) of a seat frame side part (6) directed toward the rear. The vehicle seat includes the longitudinal adjuster and a seat frame side part, which is connected to a first seat rail.

19 Claims, 3 Drawing Sheets

(52) U.S. Cl.
CPC .......... *B60N 2/0732* (2013.01); *B60N 2/4214* (2013.01); *B60N 2/4221* (2013.01); *B60N 2/4228* (2013.01)

(56) References Cited

U.S. PATENT DOCUMENTS

| | | | | |
|---|---|---|---|---|
| 6,065,805 | A * | 5/2000 | Velimvassakis | B60N 2/067 296/65.03 |
| 9,834,116 | B2 * | 12/2017 | Couasnon | B60N 2/0705 |
| 10,118,506 | B2 * | 11/2018 | Hattori | B60N 2/1635 |
| 10,322,650 | B2 * | 6/2019 | Furukawa | B60N 2/0705 |
| 10,589,639 | B2 * | 3/2020 | Susko | B60N 2/43 |
| 2002/0033625 | A1 * | 3/2002 | Goy | B60N 2/4214 297/344.18 |
| 2004/0232303 | A1 * | 11/2004 | Rausch | B60N 2/0715 248/424 |
| 2007/0194200 | A1 * | 8/2007 | Toma | B60N 2/0732 248/429 |
| 2011/0133529 | A1 * | 6/2011 | Guerrero | B60N 2/4221 297/216.18 |
| 2013/0038098 | A1 * | 2/2013 | Maier | B60N 2/1615 297/216.1 |
| 2014/0339863 | A1 * | 11/2014 | Eckhoff | B60N 2/4256 297/216.1 |
| 2015/0130242 | A1 * | 5/2015 | Markel | B60N 2/0806 297/344.1 |
| 2016/0263702 | A1 * | 9/2016 | Paing | B23K 26/244 |
| 2018/0065509 | A1 * | 3/2018 | Ohashi | B60N 2/0722 |
| 2019/0232833 | A1 * | 8/2019 | Emrich | B60N 2/0705 |
| 2019/0291605 | A1 * | 9/2019 | Emrich | B60N 2/005 |

FOREIGN PATENT DOCUMENTS

| | | | | |
|---|---|---|---|---|
| DE | 10 2012 015 343 | A1 | 1/2014 | |
| DE | 102012108306 | A1 * | 3/2014 | ............ B60N 2/073 |
| DE | 10 2013 205 096 | A1 | 5/2014 | |
| FR | 2981617 | A1 * | 4/2013 | ........... B60N 2/0705 |
| IE | 100 46 203 | A1 | 6/2002 | |
| JP | S62 18348 | A | 1/1987 | |
| WO | WO-2011118314 | A1 * | 9/2011 | ............ B60R 22/26 |
| WO | WO-2013133246 | A1 * | 9/2013 | ........... B60N 2/0732 |

* cited by examiner

LONGITUDINAL ADJUSTER AND VEHICLE SEAT

CROSS REFERENCE TO RELATED APPLICATIONS

This application is a United States National Phase Application of International Application PCT/EP2017/066922 filed Jul. 6, 2017, and claims the benefit of priority under 35 U.S.C. § 119 of German Applications 10 2016 212,907.4, filed Jul. 14, 2016 and 10 2016 217,848.2, filed Sep. 19, 2016, the entire contents of which are incorporated herein by reference.

TECHNICAL FIELD

The invention relates to a longitudinal adjuster having for a vehicle seat, in particular motor vehicle seat, having at least one rail pair which is formed from a first seat rail, in particular for connection to a seat frame side part, and from a second seat rail, in particular for connection to a vehicle structure, wherein the seat rails of the rail pair are displaceable relative to one another in the longitudinal direction (x) and engage around one another, wherein a first bracket element is fixed to the first seat rail and a second bracket element is fixed to the second seat rail, wherein the first bracket element and the second bracket element are spaced apart from one another in the normal situation, and are jammed together, in particular engage into one another, in reaction to a predefined force action, for example in the event of a crash.

BACKGROUND

DE 10 2012 015,343 A1 and DE 10 2013 205,096 A1 have each disclosed a generic longitudinal adjuster and a generic vehicle seat. The longitudinal adjuster comprises two seat rails which are displaceable relative to one another, specifically an upper rail and a lower rail, which engage around one another. A lower bracket is connected to the lower rail, wherein the lower bracket has a lower blocking region. An upper blocking region may be formed in an upper bracket connected to the upper rail, or in a seat frame side part connected to the upper rail. The lower blocking region and the upper blocking region are spaced apart from one another in the normal situation, and are jammed together in the event of a crash. Forces that arise in the event of a crash are then additionally introduced via said brackets from the vehicle seat into the vehicle structure.

SUMMARY OF THE INVENTION

An object on which the invention is based is that of improving a longitudinal adjuster of the type mentioned in the introduction, in particular of increasing the strength of the longitudinal adjuster in the event of a crash, and of providing a corresponding vehicle seat.

This object is achieved according to the invention by means of a longitudinal adjuster for a vehicle seat, in particular motor vehicle seat, having at least one rail pair which is formed from a first seat rail, in particular for connection to a seat frame side part, and from a second seat rail, in particular for connection to a vehicle structure. The seat rails of the rail pair are displaceable relative to one another in a longitudinal direction and engage around one another so as to form an internal channel. A first bracket element is fixed to the first seat rail and a second bracket element is fixed to the second seat rail. The first bracket element and the second bracket element are spaced apart from one another in the normal situation and are jammed together, in particular engage into one another, in reaction to a predefined force action, for example in the event of a crash. The first bracket element has a connection portion, which is connectable to a rearwardly directed surface of a seat frame side part.

By virtue of the fact that the first bracket element has a connection portion, which is connectable to a rearwardly directed surface of a seat frame side part, a vertical introduction of force as a result of loading of the seat frame side part in the event of a crash can be transmitted in a particularly effective manner to the reinforcement profile, whereby overloading of the rail pair after a jamming-together of the reinforcement profile and of the anchor is prevented. The strength of the longitudinal adjuster in the event of a crash is consequently increased. The "rearwardly directed surface" refers in particular to a surface of the seat frame side part which has a normal running substantially parallel to the longitudinal direction. The "seat frame side part" also refers generally to a component of a load-bearing structural component of a seat part, a transverse profile, a reinforcement element of the seat frame, or the like.

The connection portion may furthermore be formed integrally with the first bracket element. The connection portion may be bent upward about a bend axis running in a transverse direction. The connection portion may be bent upward through approximately 90° about a bend axis running in a transverse direction. The connection portion may project approximately perpendicularly from a main body of the first bracket element. The second bracket element may be formed integrally with a vehicle-specific attachment adapter, or rail-floor adapter, for adaptation to a connection profile on a structure.

The first and second bracket element may preferably be manufactured from metal, in particular from a metal sheet. The first bracket element may for example be, in the case of a vehicle seat pre-mounted on a rail pair, insertable from the rear onto the rear end between the first seat rail and the seat frame side part. The first bracket element may be held by means of a fixing element in a rearwardly directed surface of the seat frame side part. The fixing element may for example be a rivet or a screw connection.

In the connection portion and in the rearwardly directed surface, there may be provided in each case one passage bore for the purposes of the connection by means of the fixing element. The connection portion may have in each case one recess above and below a passage bore. The seat frame side part may have a projection above and below the passage bore. In the mounted state, projections of the seat frame side part may engage into the recesses of the connection portion of the first bracket element.

Alternatively, the connection portion may have in each case one projection above and below the passage bore, and the seat frame side part may have a recess above and below the passage bore, wherein the projections of the connection portion of the first bracket element engage, in the mounted state, into the recesses of the seat frame side part.

A diameter of the passage bore in the connection portion may be slightly larger than a diameter of the passage bore in the seat frame side part. A gap may be formed between the fixing element and the connection portion. The fixing element may hold the first bracket element on the seat frame side part only in a longitudinal direction. Perpendicular to the longitudinal direction, the mounted first bracket element may have a small degree of play.

The projections of the seat frame side part may be turned out of the rearwardly directed surface in a rearward direction, for example by being cut free and bent out. The projections may be stamped out of the rearwardly directed surface or connected to the rearwardly directed surface, in particular welded to the rearwardly directed surface.

The projections may be capable of being placed in engagement, in the region of an upper edge, with an upper edge portion of the recesses. A force in a vertical direction may be capable of being introduced via the connection portion into the first bracket element and, after jamming-together of the bracket elements, may be capable of being directly introduced further via the second bracket element into the vehicle structure.

An attachment of the connection portion to the rest of the body of the first bracket element may be realized substantially over the entire width of the first bracket element, in particular the entire extent in a transverse direction, whereby a load capacity of the connection between the seat frame side part and the first bracket element is increased. Furthermore, the force to be dissipated may be capable, relative to a transverse direction, of being introduced symmetrically into a left-hand part and a right-hand part, as viewed in the longitudinal direction, of the first bracket element.

The object is furthermore achieved by means of a vehicle seat having a longitudinal adjuster as per the above description, wherein the vehicle seat has a seat frame side part which is connected to a first seat rail. The vehicle seat according to the invention consequently has the same advantages as the embodiments of the longitudinal adjuster described above.

Before refinements of the invention are described in more detail below on the basis of drawings, it must firstly be stated that the invention is not restricted to the described components or to the described method steps. Furthermore, the terminology used also does not constitute a limitation, but is merely of an exemplary nature. Where the singular is used below in the description and in the claims, this also encompasses the plural in each case, unless the context explicitly rules this out.

The invention will be discussed in more detail below on the basis of an advantageous exemplary embodiment illustrated in the figures. The invention is however not restricted to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
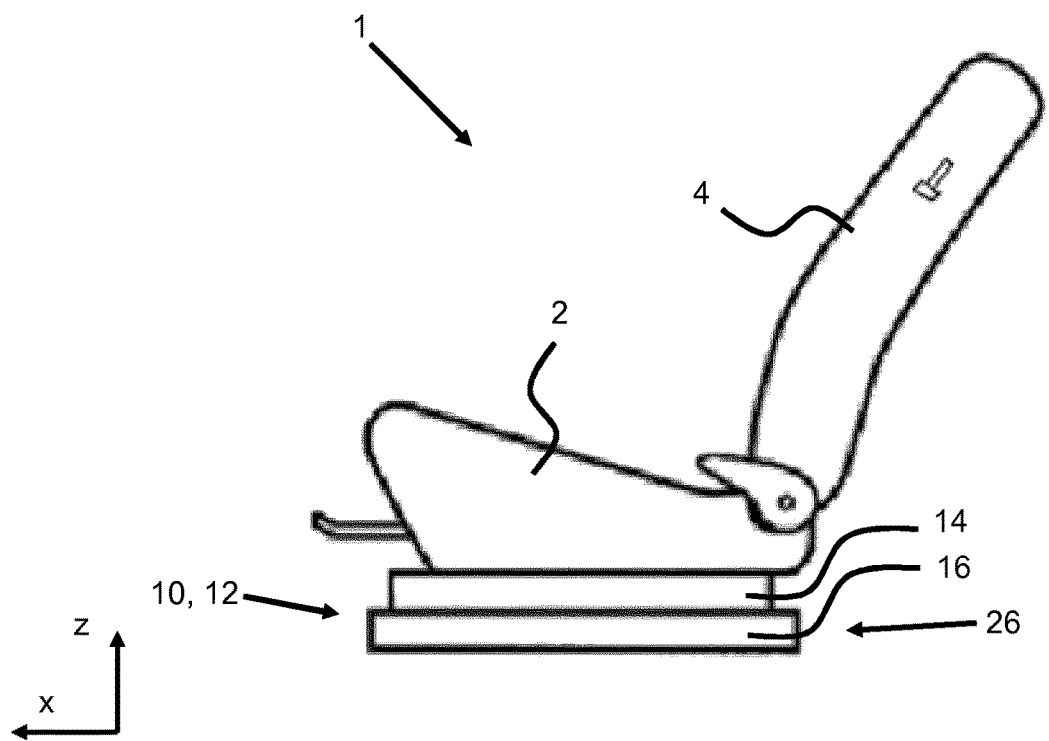
FIG. 1 is a schematic view of a vehicle seat according to the invention with a longitudinal adjuster according to the invention.

Referring to the drawings, a vehicle seat 1 schematically illustrated in FIG. 1 will be described below using three spatial directions running perpendicular to one another. In the case of a vehicle seat 1 installed in the vehicle, a longitudinal direction x runs substantially horizontally and preferably parallel to a vehicle longitudinal direction, which corresponds to the normal direction of travel of the vehicle. A transverse direction y running perpendicular to the longitudinal direction x is likewise oriented horizontally in the vehicle, and runs parallel to a vehicle transverse direction. A vertical direction z runs perpendicular to the longitudinal direction x and perpendicular to the transverse direction y. In the case of a vehicle seat 1 installed in the vehicle, the vertical direction z runs parallel to the vehicle vertical axis.

The positional terms and directional terms used, such as for example front, rear, top and bottom, relate to a viewing direction of an occupant seated in the vehicle seat 1 in a normal seating position, wherein the vehicle seat 1 is installed in the vehicle, is in a use position suitable for conveying passengers, with an upright backrest 4, and is oriented in the conventional manner in the direction of travel. The vehicle seat 1 may however also be installed in a different orientation, for example transversely with respect to the direction of travel.

The vehicle seat 1 shown in FIG. 1 for a motor vehicle has a seat part 2 and a backrest 4 which is adjustable in terms of its inclination relative to the seat part 2. An inclination of the backrest 4 may be settable for example by means of a detent fitting or a geared fitting. The vehicle seat 1 is, for adjustment of a seat longitudinal position, mounted on a longitudinal adjuster 10. The longitudinal adjuster 10 has a rail pair 12. The rail pair 12 is formed from a first seat rail 14, in particular for connection to a seat frame side part 6, and from a second seat rail 16, in particular for connection to a vehicle structure. The seat rails 14, 16 of the rail pair 12 are displaceable relative to one another in the longitudinal direction x.

Figure 2:
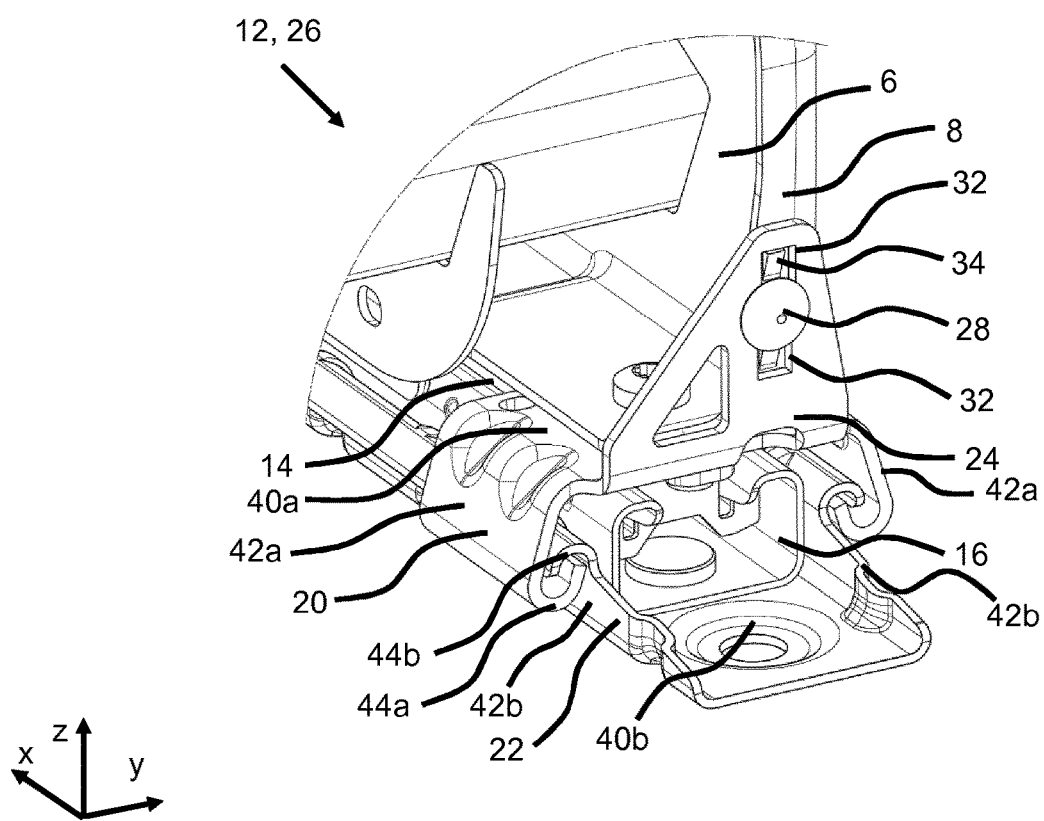
FIG. 2 is an enlarged detail perspective view of a rear end of the longitudinal adjuster.

FIG. 2 shows an enlarged detail view of a rear end 26 of the longitudinal adjuster 10. The seat rails 14, 16 of the rail pair 12 engage around one another, wherein a first bracket element 20 is fixed to the first seat rail 14 and a second bracket element 22 is fixed to the second seat rail 16. The first bracket element 20 has a main body, which is of approximately U-shaped configuration in cross section. The main body of the first bracket element 20 comprises a web 40*a*, which is arranged at least in portions between the first seat rail 14 and the seat frame side part 6. Furthermore, the main body of the first bracket element 20 has a first limb 42*a* and a second limb 42*a*. The two limbs 42*a* are connected to one another at their upper ends by the web 40*a* running in the transverse direction y. The limbs 42*a* run downward approximately symmetrically with respect to one another and so as to be inclined relative to the vertical direction z. The limbs 42*a* are, at their lower ends, bent, in the present case bent inward, by two-fold bending through approximately 180° about a bend axis parallel to the longitudinal direction x, with a hook-like portion 44*a* being formed. The second bracket element 22 is of approximately U-shaped configuration in cross section and comprises a web 40*b*, which is fastened to the second seat rail 16, and a first limb 42b and a second limb 42b. The two limbs 42b are connected to one another at their lower ends by the web 40b running in the transverse direction y. The limbs 42b run upward approximately symmetrically and so as to be inclined relative to the vertical direction z. The limbs 42b are, at their upper ends, bent, in the present case bent outward, by two-fold bending through approximately 180° about a bend axis parallel to the longitudinal direction x, with a hook-like portion 44b being formed. The hook-like portions 44a of the first bracket element 20 and the hook-like portions 44b of the second bracket element 22 engage around one another.

The first bracket element 20 and the second bracket element 22 are spaced apart from one another in the normal situation and are jammed together, in particular engage into one another, in reaction to a predefined force action, for example in the event of a crash. The first bracket element 20 has a connection portion 24, which is connected to a rear end 26, in particular to a rearwardly directed surface 8, of a seat frame side part 6. The "rearwardly directed" surface 8 refers in particular to that surface 8 of the seat frame side part 6 which has a normal running substantially parallel to the longitudinal direction x, or which runs parallel to a y-z plane. In the present case, the connection portion 24 is formed integrally with the first bracket element 20. In the present case, the connection portion 24 is bent upwardly through approximately 90° and projects approximately perpendicularly from the rest of a main body of the first bracket element 20. The second bracket element 22 may for example be formed integrally with a vehicle-specific attachment adapter for adaptation to a connection dimension on a structure.

The first and second bracket element 20, 22 are preferably manufactured from metal, in particular from a metal sheet. The first bracket element 20 may for example be, in the case of a vehicle seat 1 pre-mounted on a rail pair 12, inserted from the rear in the region of the rear end 26 between the first seat rail 14 and the seat frame side part 6. The first bracket element 20 is held by means of a fixing element 28 in the rearwardly directed surface 8 of the seat frame side part 6. The fixing element 28 may for example be a rivet. The fixing element 28 may likewise be provided by means of a screw connection. Furthermore, a further screw connection may be arranged on the seat frame side part 6 in the vertical direction z through the first bracket element 20 and the first seat rail 14.

Figure 3:
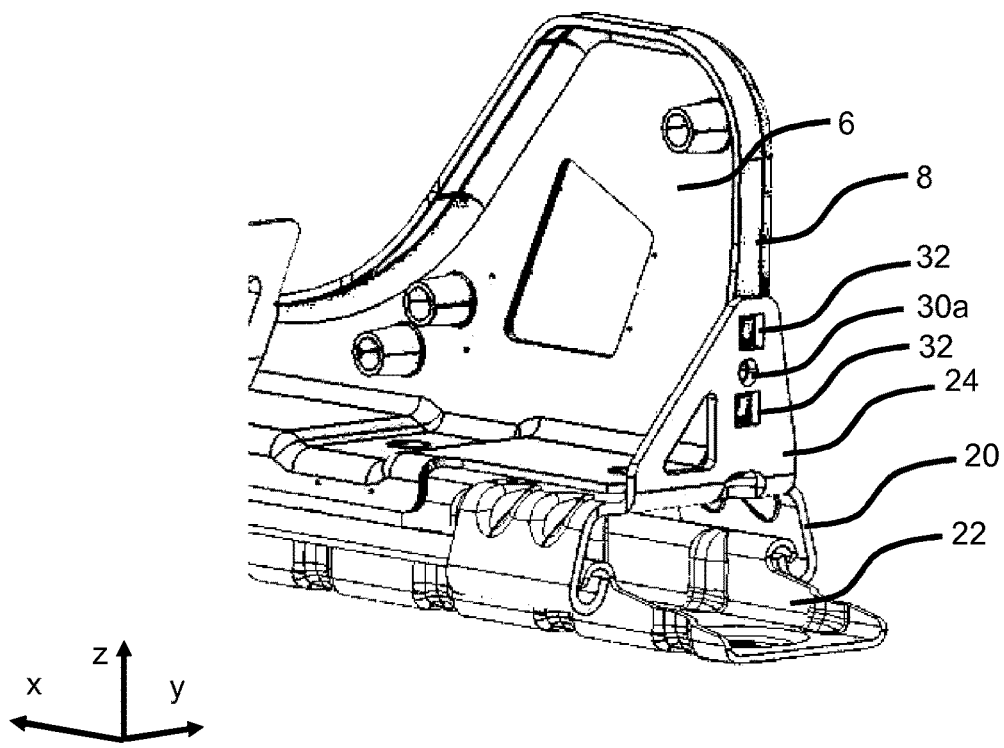
FIG. 3 is a perspective view of the rear end of the longitudinal adjuster as per FIG. 2 without a fixing element.
Figure 4:
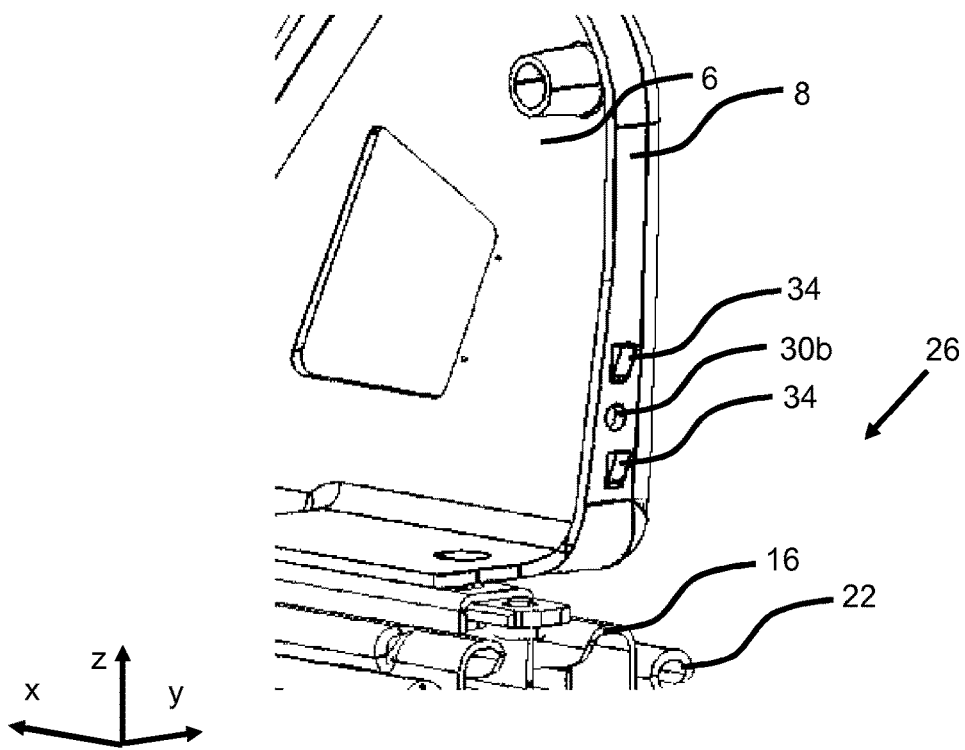
FIG. 4 is a perspective view of the rear end of the longitudinal adjuster as per FIG. 3 without a first bracket element.

FIG. 3 illustrates the longitudinal adjuster 10 as per FIG. 2 without the fixing element 28, and FIG. 4 illustrates said longitudinal adjuster without the first bracket element 20. In each case one passage bore 30a, 30b is provided in the connection portion 24 and in the rearwardly directed surface 8 for the purposes of the connection by means of the fixing element 28. The connection portion 24 has in each case one recess 32 above and below the passage bore 30a. The seat frame side part 6 has a projection 34 above and below the passage bore 30b. In the mounted state, the projections 34 of the seat frame side part 6 engage into the recesses 32 of the connection portion 24 of the first bracket element 20.

Figure 5:
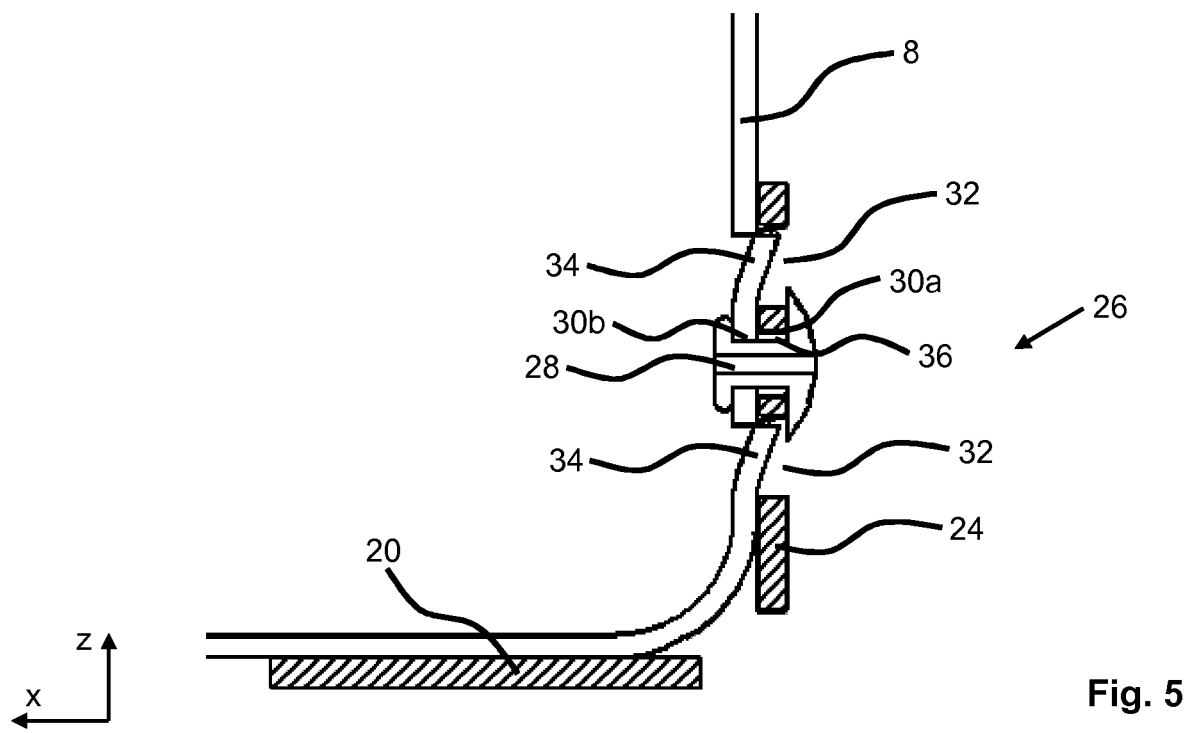
FIG. 5 is a detail sectional view, perpendicular to a transverse direction, through the longitudinal adjuster of FIG. 2.

FIG. 5 is a detail sectional illustration, perpendicular to a transverse direction y, through the longitudinal adjuster 10 of FIG. 2. The diameter of the passage bore 30a in the connection portion 24 is slightly larger than the diameter of the passage bore 30b in the seat frame side part 6. This leads to a gap 36 between the fixing element 28 and the connection portion 24. The fixing element 28 holds the first bracket element 20 on the seat frame side part 6 only in the longitudinal direction x. Perpendicular to the longitudinal direction x, the mounted first bracket element 20 has a small degree of play.

The projections 34 of the seat frame side part 6 are in the present case turned out of the rearwardly directed surface 8 in a rearward direction, for example by being cut free and bent out. It is likewise also possible for the projections 34 to be stamped out or to be fastened, in particular welded, to the rearwardly directed surface 8.

In the event of the backrest 4 of the vehicle seat 1 being subjected to an excessive force from the rear, such as may be caused for example by an unsecured cargo striking the backrest 4 in the event of a crash, the rear end 26 of the vehicle seat 1 and the seat frame side part 6 are caused to lift upward in the vertical direction z. In the event of this loading of the vehicle seat 1, an upper edge of the projections 34 engages in each case with an upper edge portion of the recesses 32. Provision is made here whereby forces in the vertical direction z can be introduced via the connection portion 24 into the first bracket element 20 and, after jamming-together of the bracket elements 20, 22, can be directly transmitted onward via the second bracket element 22 into the vehicle structure. Loading of the first and second seat rails 14, 16 in the vertical direction z is for the most part avoided, whereby, furthermore, an overload-induced deformation of the seat rails 14, 16, to the point of so-called separation, is prevented.

The attachment of the connection portion 24 to the rest of the body of the first bracket element 20 is preferably realized over substantially the entire width of the bracket element 20, in particular the entire extent in a transverse direction y, whereby a load capacity of the connection between the seat frame side part 6 and the first bracket element 20 is increased. Furthermore, the force to be dissipated can, relative to a transverse direction y, be introduced symmetrically into a left-hand part and a right-hand part, as viewed in the longitudinal direction y, of the first bracket element 20.

The features disclosed in the above description, in the claims and in the drawings may be of importance both individually and in combination for the realization of the invention in its various refinements.

Even though the invention has been described in detail in the drawings and in the above illustration, the illustrations are to be understood as being illustrative and exemplary, and not of a limiting nature. In particular, the selection of the proportions of the individual elements illustrated in the drawings is not to be interpreted as imperative or limiting. Furthermore, the invention is in particular not limited to the exemplary embodiments discussed. Further variants of the invention, and the design thereof, will emerge to a person skilled in the art from the above disclosure, from the figures and from the claims.

Expressions such as "comprise", "have", "include", "contain" and the like used in the claims do not rule out further elements or steps. The use of the indefinite article does not rule out a multiplicity. A single device may perform the functions of several of the units or devices mentioned in the claims.

While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising:

at least one rail pair formed from a first seat rail for connection to a seat frame side part and from a second seat rail for connection to a vehicle structure,
wherein the seat rails of the rail pair are displaceable relative to one another in a longitudinal direction and engage one another;
a first bracket element fixed to the first seat rail; and
a second bracket element fixed to the second seat rail, wherein the first bracket element and the second bracket element are spaced apart from one another in a normal state, and engage into one another, in reaction to a predefined force action in a crash state,
wherein the first bracket element has a connection portion, which is connectable to a rearwardly directed surface of a seat frame side part.

2. The longitudinal adjuster as claimed in claim 1, wherein the connection portion is formed integrally with the first bracket element.

3. The longitudinal adjuster as claimed in claim 1, wherein the connection portion is bent upward about a bend axis running in a transverse direction by approximately 90 degree about the bend axis running in the transverse direction.

4. The longitudinal adjuster as claimed in claim 1, wherein the connection portion projects approximately perpendicularly from a main body of the first bracket element.

5. The longitudinal adjuster as claimed in claim 1, wherein the second bracket element is formed integrally with a vehicle-specific attachment adapter, or rail-floor adapter, for adaptation to a connection profile on a structure.

6. The longitudinal adjuster as claimed in claim 1, wherein the first bracket element is, in the case of a vehicle seat pre-mounted on the rail pair, insertable from a rear in a region of a rear end between the first seat rail and the seat frame side part.

7. The longitudinal adjuster as claimed in claim 1, further comprising a fixing element, wherein the first bracket element is held by means of the fixing element in a rearwardly directed surface of the seat frame side part.

8. The longitudinal adjuster as claimed in claim 7, wherein the fixing element comprises a rivet or a screw connection.

9. The longitudinal adjuster as claimed in claim 7, wherein in each case one passage bore is provided in the connection portion and one passage bore is provided in the rearwardly directed surface facilitating connection by means of the fixing element.

10. The longitudinal adjuster as claimed in claim 9, wherein a diameter of the passage bore in the connection portion is slightly larger than a diameter of the passage bore in the seat frame side part.

11. The longitudinal adjuster as claimed in claim 7, wherein a gap is formed between the fixing element and the connection portion.

12. The longitudinal adjuster as claimed in claim 1, wherein the connection portion has a recess and the seat frame side part has a projection, wherein, in a mounted state, the projection of the seat frame side part engages into the recess of the connection portion of the first bracket element.

13. The longitudinal adjuster as claimed in claim 1, wherein the connection portion has a projection and the seat frame side part has a recess, wherein, in the mounted state, the projection of the connection portion of the first bracket element engages into the recess of the seat frame side part.

14. A vehicle seat comprising:
a seat frame side part; and
a longitudinal adjuster comprising:
at least one rail pair formed from a first seat rail connected to a seat frame side part and from a second seat rail for connection to a vehicle structure,
wherein the seat rails of the rail pair are displaceable relative to one another in a longitudinal direction and engage one another;
a first bracket element fixed to the first seat rail; and
a second bracket element fixed to the second seat rail, wherein the first bracket element and the second bracket element are spaced apart from one another in a normal state, and engage into one another, in reaction to a predefined force action in a crash state,
wherein the first bracket element has a connection portion, which is connectable to a rearwardly directed surface of a seat frame side part.

15. A vehicle seat as claimed in claim 14, wherein the connection portion is formed integrally with the first bracket element.

16. A vehicle seat as claimed in claim 14, wherein the connection portion is bent upward about a bend axis running in a transverse direction by approximately 90 degrees about the bend axis running in the transverse direction.

17. A vehicle seat as claimed in claim 14, wherein the connection portion projects approximately perpendicularly from a main body of the first bracket element.

18. A vehicle seat as claimed in claim 14, wherein the second bracket element is formed integrally with a vehicle-specific attachment adapter, or rail-floor adapter, for adaptation to a connection profile on a structure.

19. A vehicle seat as claimed in claim 14, wherein the longitudinal adjuster further comprises a fixing element, wherein the first bracket element is held by means of the fixing element in a rearwardly directed surface of the seat frame side part.

* * * * *